A. B. RYPINSKI.

ELECTRICAL RIVETING.

APPLICATION FILED JAN. 20, 1921.

Reissued May 23, 1922. 15,364.

INVENTOR

Albert B. Rypinski

BY

D. Anthony Usina, ATTORNEY

UNITED STATES PATENT OFFICE.

ALBERT B. RYPINSKI, OF BROOKLYN, NEW YORK, ASSIGNOR TO THOMAS E. MURRAY, NEW YORK, N. Y.

ELECTRICAL RIVETING.

15,364. Specification of Reissued Letters Patent. Reissued May 23, 1922.

Original No. 1,329,144, dated January 27, 1920, Serial No. 319,917, filed August 26, 1919. Application for reissue filed January 20, 1921. Serial No. 438,761.

*To all whom it may concern:*

Be it known that I, ALBERT B. RYPINSKI, a citizen of the United States, residing at Brooklyn, New York, have invented a certain new and useful Improvement in Electrical Riveting, of which the following is a specification.

Where a metal plate is to be united by riveting to a non-metal plate (the term "non-metal" here including glass, cement or porcelain, wood, rubber, fiber or the like) if the protruding end of the rivet were compressed or upset by hammering or strong mechanical pressure, the non-metal plate would be often broken or cracked if of porcelain or similar vitreous or plastic material, and if the non-metal plate were of wood or fiber the hammer or compression of the rivet would be liable to force the upset portion into the material and so make an unsightly job. It has been found practically impossible to apply rivets to porcelain or similar plastic material or to unite such plastic material to another plate by riveting for these reasons. Such porcelain is generally irregular in thickness and not even perfectly flat where the rivet head is to bear on it, and these irregularities add to the difficulty.

I believe that I am the first to provide for successfully applying rivets to porcelain or the like or for successfully riveting porcelain or the like to another plate and my invention covers a method of riveting particularly adapted for this purpose and adapted with advantage to various other uses, the invention being more particularly defined in the claims hereinafter.

Figure 1:
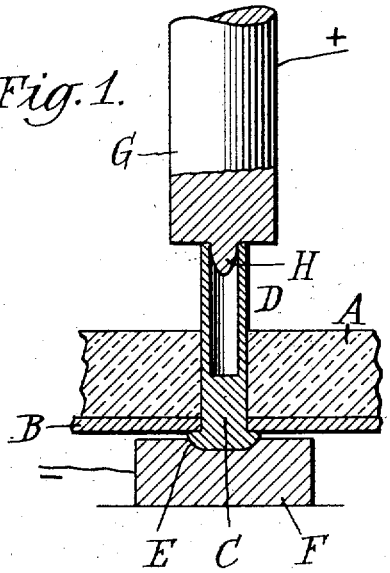
Figure 2:
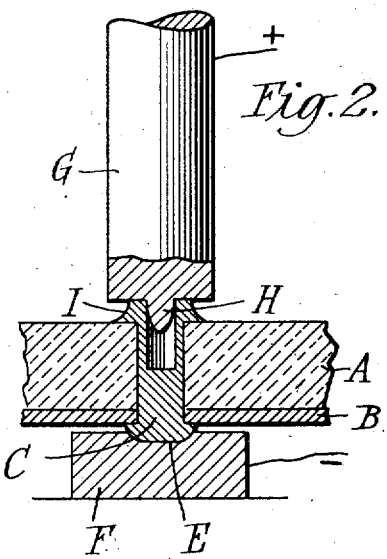
Figure 3:
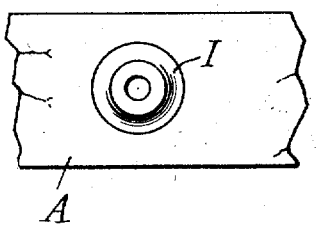
Figure 4:
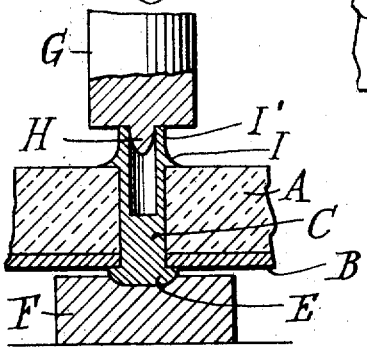

In the accompanying drawings:

Figures 1 and 2 are vertical sections of two plates, respectively of glass or porcelain and metal, to be united, the electrodes and the rivet in plate. Fig. 1 shows the position of the parts before, and Fig. 2, after, the riveting operation. Fig. 3 is a plan view of one side of the glass or porcelain plate, showing the electrically made head of the rivet, after the operation is completed. Fig. 4 illustrates another use of the process. Similar letters of reference indicate like parts.

A is a non-metal plate of glass, porcelain, fiber, rubber or other non-metallic material, to which the metal plate B is to be united. Through said plates, I form a hole to receive the shank of the metal rivet C. A tubular part D of said rivet protrudes beyond the plate A, and the head E of the rivet lies against said plate. F is a fixed electrode, in contact with which the rivet head E is placed, or said head may lie in a suitably formed recess or countersink in said electrode. G is a vertically movable electrode having on its under side a centering pin H adapted to enter the rivet C.

The plates A, B and rivet C being disposed, as shown, upon the fixed electrode F and below the movable electrode G, the pin H is introduced into rivet C and the lower face of said electrode G is caused to contact with the end of said rivet. When the current is established to said electrodes and through the rivet, the protruding part D of the rivet will become highly heated and softened, while the remainder will continue comparatively cool and hard. This is due partly to the thinness of the tubular part D, whereby the current becomes concentrated thereat, and partly to the conduction of the heat from the rivet to the contacting porcelain and metal parts. The movable electrode G being now forced downwardly, the protruding portion D of the rivet is compressed to form an annular head I, Fig. 2, which is in close contact with the surface of plate A, so that the plates A and B are tightly held together between said head I and the head E.

It will be apparent from the foregoing that after the part D of the rivet is heated and softened, but very little pressure of the movable electrode is required to compress said softened metal and to form the annular head I. Wood, rubber or fiber are abundantly hard to support the head I during its production, so that no indentation of these materials takes place, and as there is no shock or blow delivered upon the rivet, no breakage or cracking of the non-metal plate A occurs.

This mode of fastening has the further advantage of being independent of slight variations in thickness of the non-metal plate A—such as are commonly found in plates of glass, porcelain or the like—since the softened metal of head I adapts itself to any thickness of plate upon which it is formed and to inequalities of the surface thereof. The cooling of the rivet causes it to contract, and so to aid in retaining the plates closely together.

Fig. 1 shows the two provisions by which the rivet is softened at a determined point in its length. First, there is the reduction in cross-section, which results in a greater current density and consequent heating effect. Second, the heat is conducted away from the rivet by the metal electrode F and plate B and to some extent by the porcelain or similar plate A, and at its upper end by the electrode G and its centering pin H; leaving the part between the upper end of the rivet and the plate A in contact only with the non-conducting air so that the heat will be concentrated in this part of the rivet. Thus the intermediate part of the rivet will be soft enough to spread easily, while the body within the plates will hold its shape and the end of the rivet will be sufficiently hard to be shaped by the upper electrode and pin H. It is within my invention to use these expedients of reduced cross-section and heat conducting contacts to soften the rivet at any determined point in its length and throughout any desired part of such length according to the character of the product desired; and to use this method not only for riveting together the particular plates illustrated but also for the application of rivets of various other things. Not only may the plates to be fastened together be of various shapes and materials, but also the rivets may be variously shaped to secure the operation described and to secure any additional functions desired.

The heating of the rivet to a high degree at only a determined portion of its length has other advantages. It is sometimes desirable to avoid excessive heating of one or more of the parts to be joined, as for example, the plate B, or to avoid excessive heating of one or both ends of the rivet. For example, the latter may be of steel coated with copper which would be destroyed by an excessive temperature, but which can be saved by my process of concentrating the high temperature throughout an intermediate portion of the length of the rivet. Or where an end of the rivet requires to be of a particular shape to form an electric contact such shape may be preserved by the present process.

The principle of the invention may be applied also to the uniting of more than two plates, and the term "plates" is used to include a variety of articles of different shapes and dimensions. Also the reduction in cross-section referred to may be effected in various ways other than that shown of making the center hollow; and various provisions may be applied for conveying the heat away more rapidly from the adjacent points than from the point which is to be softened and upset. Also this point to be upset may be not merely on one end of the rivet as shown but at other points in the length of it. The rivet, being inserted cold, may fit closely in the holes through the plates and thus make good contact from the beginning of the heating operation.

Fig. 4 illustrates the application of the process in such a way that the actual end of the rivet is not upset. The electrode G is brought down only so far as to upset the intermediate portion of the rivet and to form a shoulder J. The end portion I′ of the rivet retains its shape under this limited movement of the electrode, being in contact with the electrode and the pin H so that the heat is conducted away from the end of the rivet less rapidly than from the part I. The projection I′, for example, may be used to make any desired electrical or mechanical connections to the rivets. By properly proportioning the original length of the rivet and the travel of the electrode the extension I′ may be produced of any desired length.

For the purpose of diminishing the cross-section of the rivet to cause its softening beyond the plate, only the protruding portion need be made hollow. In the case illustrated the hollow is extended. This is merely for economy of metal, usually copper, and the contact with the work keeps the portion of the rivet which is enclosed therein from becoming overheated, as above explained.

There is an advantage too in the upsetting of the end of the rivet against the porcelain plate A rather than against the metal plate B. The surface of the porcelain plate is more or less irregular and its thickness variable. The soft metal can be pressed down to any extent limited by the thickness and will fit into the irregularities of the surface and thus make a good bearing, a much better bearing than could be secured by the comparatively cold and solid head of the rivet. The invention includes the resulting combination of plates of metal and of porcelain or the like with the rivet having its head bearing on the metal and its shank upset and fitting closely into the irregularities of the face of the porcelain, without specific limitation to the particular design of the rivet or the method of securing the softening and shaping of the shank.

Therefore, though I have described with great particularity of detail a certain specific embodiment of my invention, it is not to be understood therefrom that the invention is restricted to the particular embodiment disclosed. Various modifications thereof in detail and in the arrangement of the parts may be made by those skilled in the art without departure from the invention as defined in the following claims.

What I claim is—

1. The method of uniting a metal plate to a non-metal plate, which consists in forming registering openings in both plates, inserting in said openings a tubular metal rivet with its head in contact with said metal plate and its shank protruding beyond said non-metal plate, placing said plates and rivet between electrodes, establishing current through said rivet to heat and soften the protruding portion of said shank, and compressing said portion while so softened to form a head in contact with said non-metal plate.

2. The method of uniting a metal plate to a non-metal plate which consists in forming registering openings in both plates, inserting in said openings a metal rivet with its head in contact with one of said plates and its shank protruding beyond the other, placing said plates and rivet between electrodes, establishing current through said rivet to heat and soften the protruding portion of said shank and compressing said portion while so softened to form a head in contact with the adjacent plate.

3. The method of uniting a metal plate to a non-metal plate which consists in forming registering openings in both plates, inserting in said openings a metal rivet with its head in contact with one of said plates and its shank protruding beyond the other, placing said plates and rivet between electrodes, establishing current through said rivet and concentrating the resulting heat in the protruding portion of said shank just beyond the adjacent plate, and compressing the softened portion to form a head in contact with the adjacent plate.

4. The method of uniting a metal plate to a non-metal plate which consists in forming registering openings in both plates, inserting in said openings a metal rivet with its head in contact with one of said plates and its shank protruding beyond the other, placing said plates and rivet between electrodes, establishing current through said rivet and concentrating the resulting heat at a point in the protruding portion of the shank just beyond the adjacent plate by maintaining a greater current density at said point than at adjacent points, and compressing the softened portion of the rivet to form a head in contact with the adjacent plate.

5. The method of uniting a plate of plastic material to a plate of metal which consists in passing a rivet through them with its head on the metal side, and softening and upsetting the shank against the plate of plastic material.

6. The method of riveting which consists in passing a one-piece rivet through the work with a portion protruding beyond the same, passing a current through the rivet from end to end thereof and concentrating the resulting heat at a determined point in the length of the protruding portion thereof and exerting an endwise pressure to upset the metal at said determined point.

7. The method of riveting which consists in passing through the work a one-piece rivet with a head on one end only, passing a current through the rivet from end to end thereof and concentrating the resulting heat at a determined point in the length thereof and exerting an endwise pressure to upset the metal at said determined point only.

8. The method of riveting which consists in passing through the work a one-piece rivet with a head on one end only and with its opposite end protruding through the work and having a reduced cross-section, and passing a current through said rivet, thus effecting a concentration of the resulting heat at said protruding portion of reduced cross-section, and exerting an endwise pressure to upset the metal at said point of reduced cross-section.

9. The method of applying a rivet to a device including a plate of plastic material which consists in passing the rivet through said plate with an end projecting beyond said plate, passing a current through the rivet and softening and compressing the projecting portion against said plate to form a head in direct contact therewith.

10. The method of applying a rivet with a head on one end thereof to a device including a plate of plastic material, which consists in passing the rivet through said plate, holding it in place at the headed end, with its opposite end projecting through said plate, passing a current through it and softening and compressing the projecting portion thereof against said plate to form another head in direct contact with said plate.

11. The method of riveting which consists in providing the rivet with a hollow end, passing said rivet through the work with its hollow end protruding therefrom and passing a current through the rivet, thus effecting a concentration of heat at said end, and upsetting said end.

12. The combination of a metal plate, a plate of plastic material and a rivet passing through said plates and holding them together, the head of the rivet bearing on the metal plate and the shank of the rivet being upset against the face of the plate of plastic material and forced into a close fit with the irregularities thereof.

In witness whereof, I have hereunto signed my name.

ALBERT B. RYPINSKI.